United States Patent [19]

Von Kohorn

[11] Patent Number: 4,605,973
[45] Date of Patent: Aug. 12, 1986

[54] SYSTEM, APPARATUS AND METHOD FOR RECORDING AND EDITING BROADCAST TRANSMISSIONS

[76] Inventor: Henry Von Kohorn, 22 Perkins Rd., Greenwich, Conn. 06830

[21] Appl. No.: 717,828

[22] Filed: Mar. 29, 1985

Related U.S. Application Data

[63] Continuation-in-part of Ser. No. 410,464, Aug. 23, 1982, Pat. No. 4,520,404.

[51] Int. Cl.$^4$ .......................... H04N 5/76; H04H 1/00
[52] U.S. Cl. ....................................... 358/335; 358/86; 358/908; 455/4
[58] Field of Search .................... 358/335, 908, 84, 86, 358/114; 360/33.1, 27; 455/2, 4, 179, 181, 185, 186

[56] References Cited

U.S. PATENT DOCUMENTS 3,889,050  6/1975  Thompson .............................. 455/2
4,305,101  12/1981  Yarbrough et al. ................ 360/33.1
4,323,921  4/1982  Guillou ..................................... 455/2

Primary Examiner—Donald McElheny, Jr.
Attorney, Agent, or Firm—Perman & Green

[57] ABSTRACT

A remote recording and editing system for use with a transmitter of broadcast programs, including both television and radio programs, provides for the monitoring of the broadcast transmissions of the transmitter and the generation of recording and editing command signals. The command signals are broadcast from a central station to receiving stations, such as homes having television sets, to permit editing of the broadcast transmissions during the presentation of a program on home television sets and during recording of the program. The television receiver, as well as the recording apparatus, is provided with an inhibiting circuit, responsive to the command signals, for accomplishing the editing by the deletion of unwanted material. The circuits inhibit the presentation of the program as well as the recording of the program. A person in the central station monitors the television program and activates a generator of the command signals to provide for the selective recording and editing of the programs. A delay unit delays presentation of the program to provide time for response by the monitoring person. Individual programs can be selected for recording and/or editing and specific types of material can be deleted during the editing.

41 Claims, 4 Drawing Figures

SYSTEM, APPARATUS AND METHOD FOR RECORDING AND EDITING BROADCAST TRANSMISSIONS

This application is a continuation-in-part of Ser. No. 410,464 filed on Aug. 23, 1982, U.S. Pat. No. 4,520,404.

BACKGROUND OF THE INVENTION

This invention relates to broadcast transmissions and, more particularly, to the editing of broadcast transmissions, such as television programs, by remote control during an original presentation and during recording of such programs.

As is well known, television programs are widely received by television receivers in residences throughout the country. More recently, an interest in the recording of television programs at home has developed, and suitable recording equipment for use in the home has become commercially available.

A factor to be considered in the use of recording equipment for recording a sporting event, and other subject matter of television and radio programs, is the occurrence of interruptions of the event due to advertisements, intermissions, and inclement weather conditions. In the case of advertisements, the commercial message of the sponsor of the television program is properly viewed during the original presentation of the television program. There is no need to view such commercial messages years later when the recording may be viewed. Indeed, the intent of the sponsor is publicizing his message has been fully accomplished during the initial presentation of the television program. It is, clearly, not the intent of either the sponsor or the viewer to have repetitive presentations of the commercial message over the many years in which the home viewer may view the recorded program.

Thus, it is seen that there is a need for the editing of television programs, as well as radio programs, during the recording of such programs in the home or at other locations where television sets are used. Typically, such editing by the deletion of commercial messages, as well as by the deletion of intermissions and interruptions of the program caused by associated inclement weather such as in sports broadcasts, is accomplished by the viewer himself in operating the switches on the control panel of such recording equipment.

It may also be desirable to edit the programs during their presentation. Thus, in the home where there are children, a parent may which to delete material requiring a mature audience, or have the television deactivated when children are to study or sleep. Other examples of circumstances in which material might be deleted are intermission periods during operas, plays, concerts, and other forms of art, as well as during "time out" periods in sporting events. Thus, the viewer deletes the unwanted material by stopping the reception and/or the recording process until after the interval of the interruption, at which time the viewer reinstitutes the reception and/or recording process.

However, a problem arises in the use of such television, radio and recording equipment when the viewer is away from his home, as might occur whether or not children are at home, and the recording equipment is set to operate by means of a timer, in that the viewer cannon personally perform the editing. Also, the problem persists even when the viewer is home in that such editing is an inconvenience to the viewer in his watching of the presentation of the program on his television set. Furthermore, in some situations, by the time undesirable subject matter is noticed, it may be too late to take effective action for editing the material of the program.

SUMMARY OF THE INVENTION

The aforementioned problem is overcome and other advantages are attained by a system, apparatus and method which provide for the remote control of the editing of broadcast transmissions of radio and television programs and their audio and audio-visual information and, particularly, programs which are being recorded on home recorders. At a central station, one person monitors the programs as viewed on a central monitor, or television receiver, and then provides a control signal, or editing command signal, which is transmitted to many homes simultaneously for remote control of their respective receiving and recording equipment. Also provided at the central station is a circuit activated by the person viewing the central monitor for transmitting the control signals by air or by cable to the home recorders. The invention provides the functions of activation and deactivation of the equipment which have previously been accomplished by the viewer in his operation of the control panel of the recording equipment. The invention may be implemented on the basis of a service to which the individual home viewers would subscribe, the service necessitating the installation of a control circuit within the recording equipment to permit the remote control.

The control signals may have a digital signal format, such as a digital word for commanding the deactivation and activation, or an analog signal format, such as one or more tones which signal the deactivation or activation of the recording equipment. By placing the spectral components of the control signals about a radio-frequency (RF) carrier away from the portion of a spectral band utilized for communication, and by reducing the amplitudes of the control signals, the control signals may be transmitted along with a standard radio broadcast so that no special transmission channels need be reserved for the transmission of such control signals. Accordingly, the system of the invention includes suitable modulating and demodulation equipment to implement the carrier transmission of the control signals. Also, by use of a central radio transmitter, employing a transponder-type circuit, the control signal may be transmitted to the transponder directly from the monitoring station, and then retransmitted by the transponder to the sites of the individual home receivers. A delay unit would delay presentation of the program on the home receiver to provide time for monitoring personnel to view the material before the material is presented to a home viewer. Alternatively, the control, or editing command signal may be provided as a set of tones at one end of an audio channel for transmission jointly with voice signals of the program which is to be edited.

Thereby, the system is conveniently implemented for the use of subscribers of the service for the editing of television and radio programs so as to permit the uninterrupted recordation of desired portions of such programs. In addition, if desired, cut-out circuitry can be included within the television set so as to permit the blanking of the television set from the view of children during the broadcast of undesirable subject matter. The circuitry for deactivating and reactivating the television set and/or the recorder in response to the control signals may be mounted within the chassis of the television set and/or the recorder; alternatively, the circuitry may be located away from such equipment and coupled thereto by an acoustic link. Thus, by subscribing to the foregoing service, the invention permits the deletion of undesirable subject matter from programs which may be viewed by children, even when the parents are absent from the home.

BRIEF DESCRIPTION OF THE DRAWINGS

The foregoing features and other aspects of the invention are explained in the following description taken in connection with the accompanying drawings wherein.

DESCRIPTION OF THE PREFERRED EMBODIMENT

Figure 1:
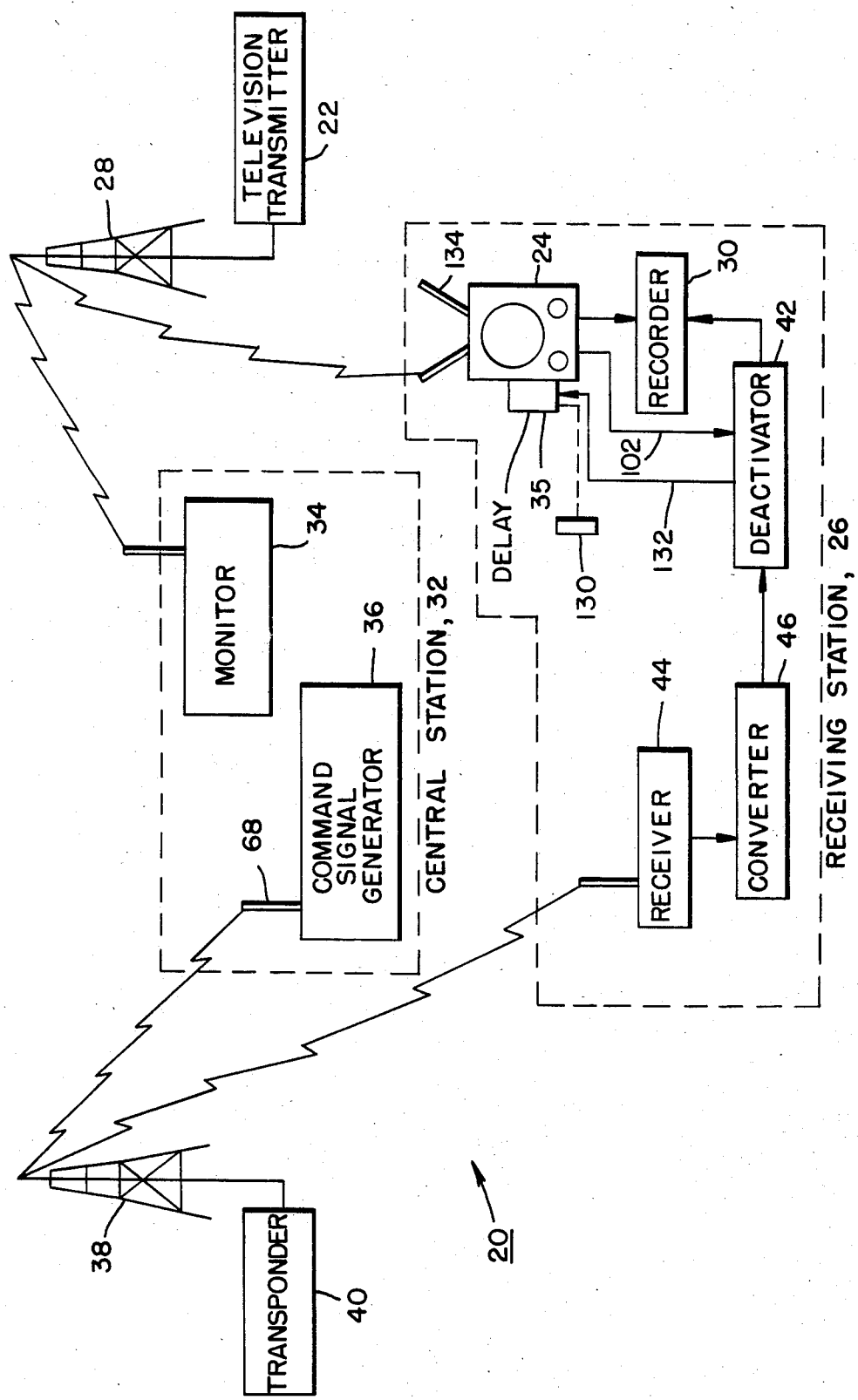
FIG. 1 is a stylized view of the system incorporating the invention providing for the recording and editing, under remote control, of the programs of broadcast transmissions.

With reference now to FIG. 1, there is shown a system 20 which incorporates the invention for recording and editing programs broadcast from a television transmitter 22 and received at a television receiver 24 in a receiving station 26. Typically, the receiving station 26 would be a residence, and the television receiver 24 would be the standard form of television set customarily utilized at home. The television transmitter 22 is shown coupled to an antenna 28 for the broadcasting of the television programs to receiving stations at sites both near and far. While the antenna 28 is shown as a means for the propagation of the RF (radio frequency) carrier for broadcasting the television programs, it is to be understood that the television program could also be brought to receiving stations by means of cables (not shown) as in cable TV. Also, it is noted that while an exemplary television transmitter 22 is shown for the broadcasting of television programs, it is to be understood that radio programs, transmitted by a radio transmitter (not shown), could also be edited by the system 20 of the invention. Thereby both radio and television data can be transmitted too.

In many homes, today, commercially available recording devices have been connected to the television set for the recording of television programs which have been received on the television set. One such recorder 30 is shown connected to the television receiver 24 for the recording of television programs. Such recorders are provided with manual controls on a panel (not shown) whereby a viewer of the television programs may select a program to be recorded. Indeed, presently available equipment includes timing circuitry whereby the recorder can be preset by the viewer to operate at a later time when the viewer may no longer be in his home. Of course, if the viewer is at home when the recording is being accomplished, then he has the option to shut down the recording at such times as when there may be a break in the programming. For example, if an opera is being recorded, and an intermission with an interview of one of the cast is being provided, the viewer may shut down the recorder during the interview so that the resulting recording is free of such interruptions. Similarly, in the event of a sports event, such as a football game, the viewer may wish to delete the half-time presentation from the recording of the game. And, in the situation wherein young children are in the home, the parent may wish to shut down both the recorder and the television set during a period of time in which the program material is deemed unsuitable for viewing by the children. Similar comments would apply to the reception and recording of a radio program. As long as the viewer or parents is at home, or such other location where television may be viewed, the parent or viewer can manually perform the task of editing the program so that only the desired portions of the program are recorded, or presented on the television set.

Thus, FIG. 1 shows two separate devices for presentation of data of the broadcast transmissions, namely the display of the television receiver 24 and the recorder 30. Either or both of these devices can be operated under control of the invention.

In accordance with the invention, the system 20 provides for the recording and editing of the broadcast programs to be accomplished by a person located at a central station 32, under instructions from the parent or viewer. Thereby, the editing can be accomplished while the viewer is away from home. In addition, the parent may avail himself of the services of the person at the central station 32 for shutting off certain programs at the television receiver 24, which programs might otherwise be viewed by the children, against the wishes of the parent. The central station 32 is provided with a monitor 34 by which one or more persons at the central station 32 can view and listen to the broadcast transmissions which are to be edited. A delay unit 35 connects with the television receiver 24 to delay presentation of program material until monitoring personnel at the central station 32 have had time to review the program material prior to its presentation to home viewers. Instructions for the editing are set forth in the form of a command signal, or message, which is made available to the receiving stations 26.

The command signals are generated by a generator 36 and are coupled therefrom to an antenna 38 which, in turn, is connected to a transponder 40. The transponder 40 receives the command signals via the antenna 38 to the receiving stations 26. While transmissions between the antenna 38, the central station 32 and the receiving stations 26 are shown by way of signal propagation through the air at a suitable carrier frequency, it is to be understood that such transmission could also be accomplished by means of cables as in cable TV. In addition, is should be noted that the command signal can be modulated onto a carrier in a format in which the spectral space devoted to the modulation is sufficiently small so as to permit the command signal to be carried, for example, along with a radio transmission from a radio station (not shown). Thereby, a separate antenna, such as the antenna 38 need not be constructed, and existing antennas of radio stations might be utilized. For example, a minimum spectrum can be obtained by use of a set of tones modulated above a subcarrier, or the main carrier, wherein the presence and absence of predesignated ones of the tones serves as an encoding of the message of the generator 36.

In order to operate the recorder 30 by remote control, additional circuitry, shown as a deactivator 42, is to incorporated with the recorder 30 to stop the operation of the recorder 30 for the deletion of specific material of the broadcast program. Corresponding circuitry (not shown) would also have to incorporated within the television receiver 24 in the event that a television program is to be interrupted during its reception by the television receiver 24. One of the advantages of the system of the invention is readily appreciated in the situation wherein the owner of a television set may be away from home for an extended period and, accordingly, would miss a series of sporting events such as the world series in baseball, or soccer. Accordingly, he would notify the central station, either by letter or by telephone a few days or even months ahead, that his television set and recorder should be activated for each game irrespective of the number of games and the dates when they are to be played.

By way of example in the construction of the deactivator 42, the circuitry thereof may be coupled to a motor drive circuit which drives the recording medium or tape (not shown) whereby the stopping and starting of the motor drive accomplished the deletion of the unwanted material. The receiving station 26 also includes a receiver 44 for receiving the command signal transmitted from the antenna 38, and a converter 46 for converting the format of the encoded command signal to a signal format suitable for operation of the deactivator 42. The receiver 44, the converter 46 and the deactivator 42 constitute additional circuitry which would be installed within the home or other site of a receiving station 26 for operation of the recorder 30. Typically, such circuitry could be constructed in the form of a relatively small module (not shown) which could be attached to the recorder 30. Such circuitry in the modular construction can also be used for stopping and starting reception of programs on the television receiver 24.

Figure 2:
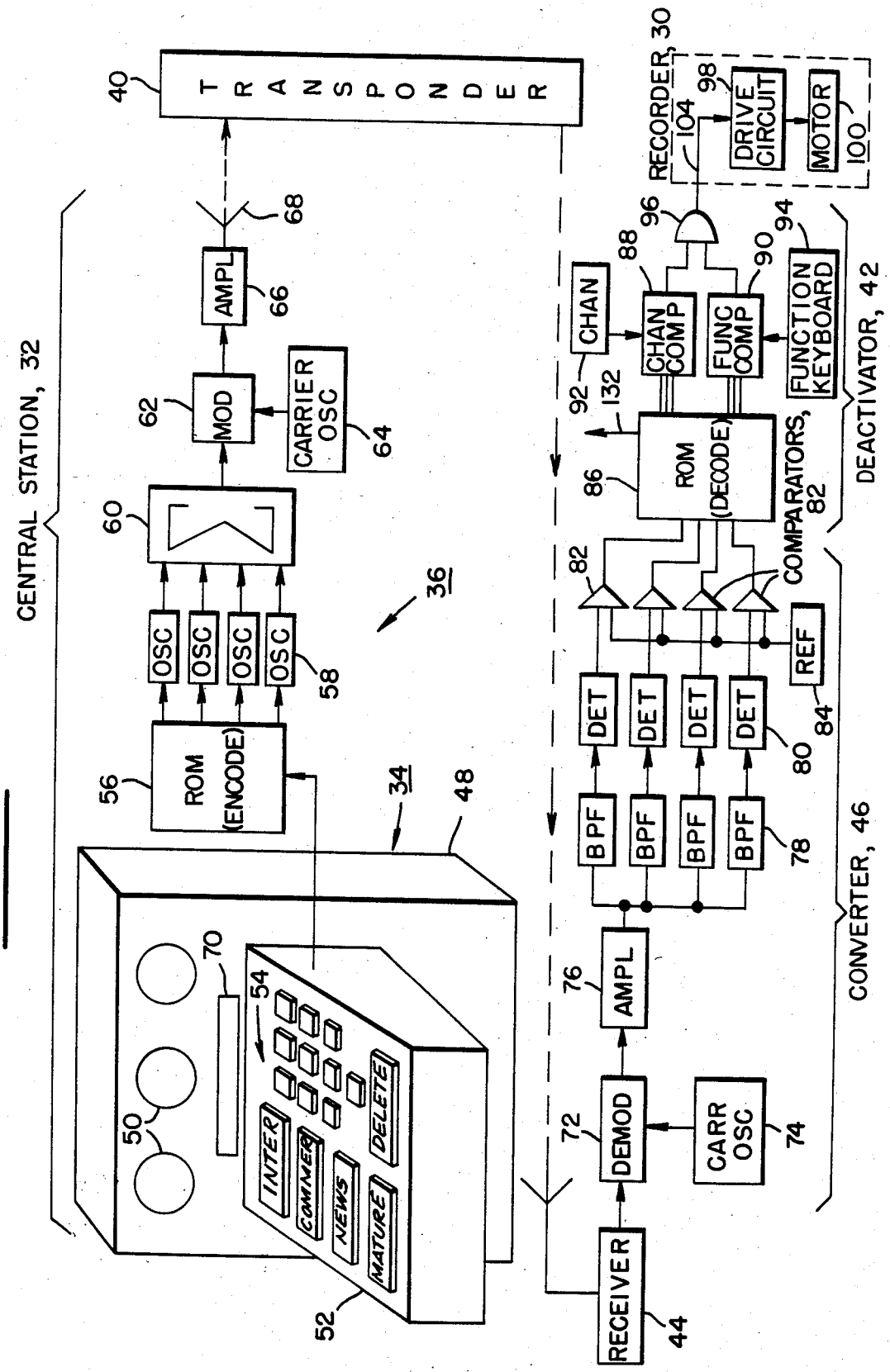
FIG. 2 is a block diagram of equipment utilized in the central station and in the receiving station of the system of FIG. 1.

FIG. 2 shows further details of the central station 32, the converter 46 and the deactivator 42. The monitor 34 is shown in the form of a console 48 having three displays 50 for the simultaneous viewing of a plurality of television programs, and a keyboard 52 whereby an operator (not shown) can enter data into the command signal generator 36. The keys 54 may be lit to indicate operation of the keys.

By way of example in the construction of the keyboard 52, there are shown ten keys 54 for the entry of numerical data and five other keys bearing labels in the drawing to show their functions. The keys 54 are utilized to identify a television channel for which an editorial instruction is designated. The nature of the material to be deleted is entered by pressing the delete key concurrently with one of the keys identifying the material, such as any one of the four exemplary keys labeled intermission, commercial, news, and mature. The delete key is pressed once at the beginning of the interval in which the unwanted material is to be deleted, the delete key being depressed a second time to terminate the deletion interval. Thereby, an operator of the console 48 can simultaneously view the television programs, which have been assigned to him, and enter the message which is to be distributed by the central station 32 to the receiving stations 26 of those who subscribe to the services of the system 20. It is to be understood that the set of keys shown on the keyboard 52 is exemplary only, and that additional keys may be employed for still further messages. Also, it is noted that, if desired, a daily code work might also be utilized in the transmitted message so as to prevent persons, other than the authorized subscribers to the service, from receiving the benefits of the service in their homes.

The generator 36 further comprises a read-only memory 56, a set of oscillators 58, a summing circuit shown as summer 60, a modulator 62, a carrier oscillator 64, an amplifier 66, and an antenna 68. The memory 56 has a set of parallel output lines which connect with individual ones of the oscillators 58 whereby selected ones of the oscillators 58 are activated in response to the output signal of the memory 56. While only four exemplary oscillators 58 are shown, it is to be understood that ten oscillators would preferably be utilized to provide an adequate number of symbols in the coded representation of the message to identify all of the television channels, plus the nature of the material which is to be deleted. The memory 56 is addressed by signals from the keyboard 52 to provide the requisite output signal whereby the message of the keyboard is encoded into a set of tones provided by the oscillators 58. The "delete" key on the keyboard 52 also serves as a data entry key whereby the typed-in message, appearing on a small display 70, is then transmitted to the memory 56.

The output signals of the oscillators 58 are coupled to the summer 60 which sums together these signals to provide a composite tone signal which is applied to the input terminal of the modulator 62. By way of example, the summer 60 may comprise an operational amplifier (not shown) having a set of input summing resistors coupled to individual ones of the oscillators 58. A carrier frequency signal from the oscillator 64 is also coupled to the modulator 62 whereby the set of tones is modulated onto the carrier of the oscillator 64. The modulation may be accomplished by amplitude modulation, phase modulation, or frequency modulation as may be desired. The output modulated signal of the modulator 62 is then amplified by the amplifier 66 and applied to the antenna 68 from which it is radiated to the antenna 38 (FIG. 1) and the transponder 40. By way of alternative embodiments, it is noted that the digital signal of the keyboard 52 could be applied directly to a modulator (not shown) coupled to the oscillator 64 whereby the digitally formated message signal could be modulated onto the carrier by well-known techniques such as amplitude modulation, phase shift modulation, or pulse width modulation. The nature of the demodulation process to be utilized by the converter 46 is, of course, selected to correspond to the form of modulation employed in the generator 36. The set of tones provided by the set of oscillators 58 is implemented in the preferred embodiment of the invention in order to provide for reduced spectral content to the transmitted signal.

The converter 46 (FIG. 2) comprises a demodulator 72, an oscillator 74 operating at the carrier frequency, an amplifier 76, a set of band pass filters 78, a corresponding set of detectors 80, a corresponding set of comparators 82, and a source 84 of a reference signal for the comparators 82. In operation, the receiver 44 receives the radio frequency signal transmitted from the antenna 38 (FIG. 1) and amplifies the signal to a suitable level for operation of the demodulator 72. The demodulator 72 utilizes the carrier frequency signal of the oscillator 74 for demodulating the signal received by the receiver 44, the operation of the demodulator 72 being the inverse process of the modulator 62 so that a signal appearing at the output terminal of the demodulator 72 is the same as the signal appearing at the output terminal of the summer 60. The output signal of the demodulator 72 is then amplified by the amplifier 76 and applied to the set of band pass filters 78. Each filter 78 is tuned to the frequency of the tone of a corresponding one of the oscillators 58. The presence of any one of the tones in the demodulated signal is then detected by a corresponding one of the detectors 80. Since each tone can propagate through only one of the filters 78, in accordance with the frequency of the tone, the detectors 80 detect the amplitudes of the tones transmitted through the corresponding ones of the filters 78.

It is noted that the amplitudes of the signals appearing at the output terminals of the filter 78 can vary depending on weather conditions since the weather affects the transmission path between the antenna 38 and the receiving station 26. To insure that the signal strength detected by the detector 80 is of adequate amplitude to ascertain the presence of a tone at the output of a filter 78, and that the converter 46 will not respond merely to noise in the filter 78, the output signal of each detector 80 is compared in a corresponding one of the comparators 82 to the reference signal of the source 84. When the detected amplitude is greater than that of the reference signal, the comparator 82 provides a logic 1 signal, and when the detected amplitude is less than the amplitude of the reference signal, the comparator 82 provides a logic 0 signal. Thus, the set of comparators 82 provide a digital word equal to the word appearing at the set of output terminals of the memory 56. Thereby, the converter 46 has provided the functions of demodulation and decoding of the editorial message transmitted by the central station 36.

The operation of the deactivator 42 and the recorder 30 of FIG. 2 will now be explained. The deactivator 42 comprises a read-only memory 86, comparators 88 and 90, a source 92 of channel data, a keyboard 94 for selecting the editorial functions as to which types of material are to be deleted, and an AND gate 96. The recorder 30 includes an exemplary drive circuit 98 and a motor 100 which is activated by the circuit 98. In operation, the drive circuit 98 provides the electric power for driving the motor 100. Such circuits are well-known in the transport of recording media such as that of tape cassettes. By means of a logic signal provided by the gate 96, the circuit 98 is activated or deactivated, a logic 0 signal activating the circuit 98 while a logic 1 signal deactivates the circuit 98. The memory 86 is addressed by the logic word of the set of comparators 82 to provide logic words at its output terminals, one of the memory output terminals being coupled to an input terminal of the comparator 88 while the second memory output terminal is coupled to the comparator 90. The digital word provided by the memory 86 to the comparator 88 corresponds to the channel which was designated by the keys 54 of the keyboard 52. The digital word provided by the memory 86 to the comparator 90 corresponds to the word entered by the function keys of the keyboard 52, which keys indicate the nature of the material to be deleted.

The source 92 of channel data may be a keyboard or other similar data entry device whereby the viewer at the receiving station 26 can enter the numerical designation of the channel on which a program is to be received, this being the program which is edited. Alternatively, the source 92 of channel data may be an electronic connection via line 102 (FIG. 1) between channel selection circuitry already contained within the television receiver 24. Thereby, the comparator 88 receives both the channel designated by the source 92 as well as the identification of the channel to which the editorial message pertains. Thus the receiving station 26 is rendered non-responsive to all of the transmissions of the central station 32 except for the editorial messages pertaining to the television channel which is being viewed.

The comparator 90 compares the requested function of the keyboard 94 with the function contained within the editorial message. Thereby, the receiving station 26 is rendered non-responsive to all editorial messages except those dealing with the editing of the designated material. Thus, by way of example, in the case wherein the viewed has requested deletion of advertising material, when the operator at the central station 32 transmits an editorial message for the deletion of an intermission period, the comparator 90 provides a logic 0 signal which permits the recorder 30 to continue its operation. By way of further example, possible the viewer had selected the mature-audience function at the keyboard 94 in which case, whenever an editorial message relating to the mature material is broadcast, and for the designated channel as designated by the source 92, then a logic 1 signal appears at the output terminal of the comparator 88. The two logic 1 signals then activate the AND gate 96 to deactivate the drive drive circuit 98 so that the motor 100 stops. Thereby, the recorder 30 will not record the material relating to the mature audience. If desired, the comparator 90 can be constructed for the inclusion of comparisons with a plurality of functions words to provide for the deactivation of the recorder 30, by way of example, for both news breaks and intermission breaks.

By means of the foregoing circuitry, a viewer of the television programs can request the editing of his programs, designate which programs are to be edited, and what portions of the programs are to be edited, and what portions of the programs are to be deleted, all this being accomplished by remote control wherein an operator in the central station monitors the television programs and transmits editing messages which automatically operate the recording equipment. Additional equipment, not shown, may also be incorporated in the television set to provide for the editing of television programs as they are being received and presented on the television set; the additional equipment being operated by signals on line 104 from the gate 96. For example, the signal on line 104 might be applied to a blanking terminal of circuitry controlling the z axis of the CRT of the television receiver 24. Thereby, both the initial presentation on the television set as well as the recording of the television programs can be edited by the system of the invention. Viewers at any number of locations may utilize the services of the operator at the central station since the editing messages are distributed to the viewers by broadcast transmissions. In the case wherein the viewers are subscribers to a service which provides selected recording and editing, each of the receiving stations would then be a subscriber station and access to the editorial messages of the central station would be provided upon payment of a fee. In order to prevent the unauthorized use of the editing messages by those who have not paid the fee, the messages could be further coded, in a well-known manner, with corresponding decoding circuitry employed at each receiving station so as to permit the reception of the editing messages only by those who are authorized subscribers to the service.

It is further recognized that the transmitting station of the television or radio program may also be adapted for providing the foregoing monitoring service, in which case the monitoring equipment would be located at the site of the transmitting station. Thereby, the system of FIG. 1 can be modified to provide for the transmission of the editing command signals directly from the antenna 28 along with the transmission of the television program. Such an arrangement permits a simplification in the construction of the system of the invention by the deletion of the antenna 38 and the transponder 40 of FIG. 1. The editing command signals are then conveniently combined with the voice signals as part of the audio component of the television signal as shown in FIG. 3.

Figure 3:
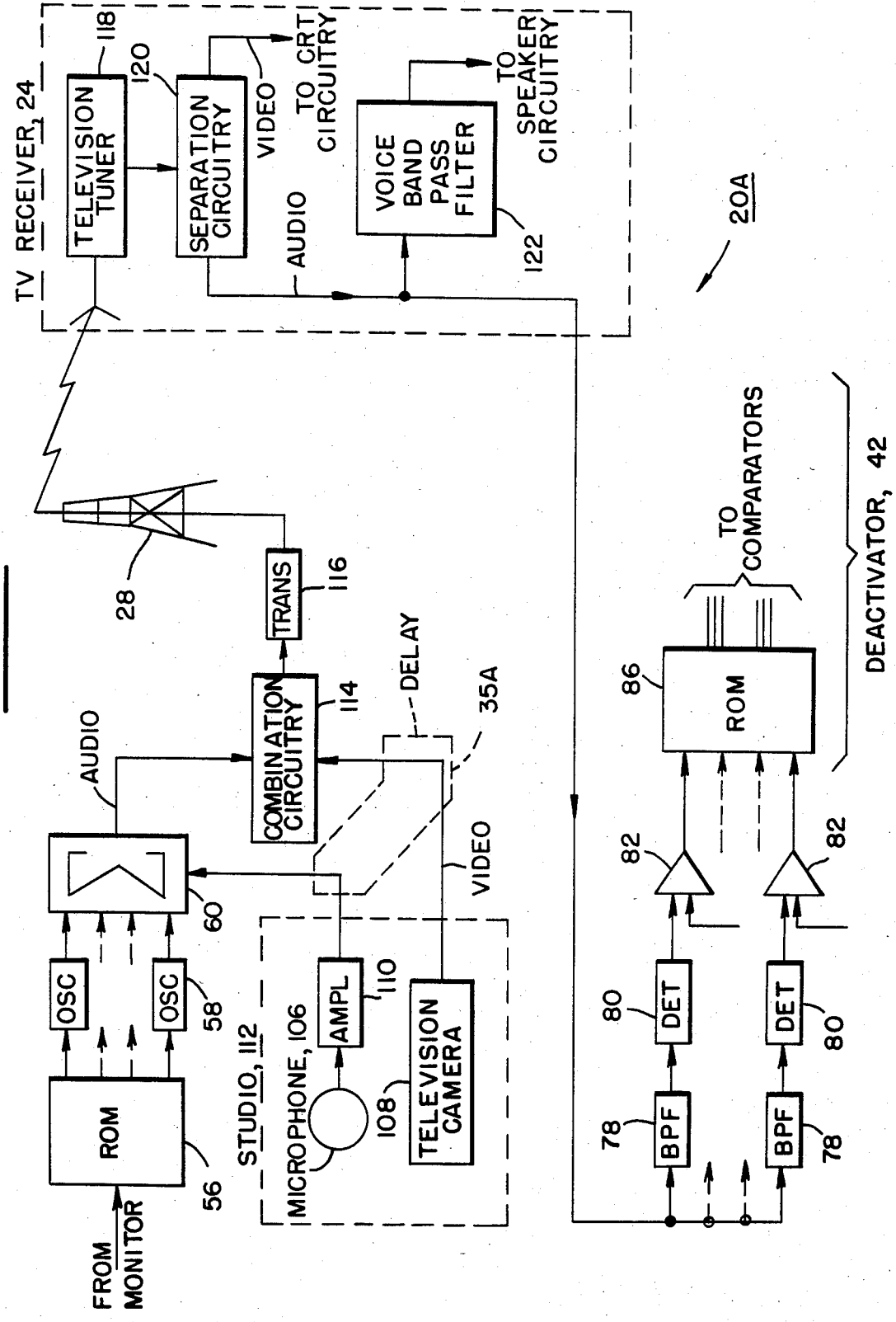
FIG. 3 shows a modified portion of the system of FIGS. 1 and 2 wherein an editing signal is transmitted jointly with the broadcast of a program to be edited.

In FIG. 3, there is presented a modified portion of the system of FIGS. 1 and 2 wherein the audio component of the television signal includes the editing command signals so as to permit the deletion of the antenna 38 and the transponder 40 of FIGS. 1–2. The modified system 20A of FIG. 3 comprises the memory 56, the oscillators 58 and the summer 60 of the generator 36 of FIGS. 1 and 2, and the filters 78, the detectors 80, the comparators 82 of the convertor 46, as well as the deactivators 42 of FIGS. 1 and 2. Also shown in FIG. 3 are a microphone 106, a television camera 108 and an amplifier 110 for use in a television studio 112, combination circuitry 114, a transmitter 116 coupled to the antenna 28 (shown also in FIG. 1), and the components of the television receiver 24 (FIG. 1). The foregoing components of the television receiver 24 are a tuner 118, separation circuit 120, and a voice band-pass filter 122.

The operation of the memory 56 and the oscillators 58 is the same as that previously disclosed with reference to FIGS. 1 and 2. In the studio 112, the microphone 106 picks up the voice signals which are then amplified by the amplifier 110 and summed together with the oscillator signals in the summer 60. By way of example in the encoding of the editing command signals, each of the oscillator signals is presumed to be at a frequency below that of the voice spectrum to be transmitted. Thereby, the foregoing signals can be summed by the summer 60 without any mutual interference. The summer 60 outputs the audio signal while the camera 108 outputs the video signal, the audio and video signals being combined in a well-known manner by the circuitry 114 and transmitted by well-known techniques in the transmitter 116. The transmitter 116 is coupled to the antenna 28 for the broadcasting of the television programs as was described in FIG. 1.

The television receiver 24 receives the broadcast signal of the antenna 28. The signal is first processed by the tuner 118 followed by the separation of the audio and the video components by the circuitry 120 as is well known. In accordance with a feature of the invention, the audio component is applied simultaneously to the filter 122 and to all of the filters 78. The passband of the filter 122 excludes the frequencies of the tones of the oscillators 58 while being sufficiently wide to pass the frequency spectrum of the voice signals. The tone signals, whichever ones may be present, are passed by the respective ones of the filters 78 for detection by respective ones of the detectors 78 for detection by respective ones of the detectors 80. The video signal extracted by the separation circuitry 120 is applied to the CRT (cathode ray tube) circuitry of the television receiver 24 while the voice signal outputted by the voice filter 122 is applied to the speaker circuitry of the television receiver 24. The detected tone signals are applied via the comparators 82 (as described with reference to FIG. 2) to the memory 86 for operation of the deactivator 42 in editing the received television program.

With respect to the transmission of the command signals for the central station to the subscriber station, it is recognized that a subscriber might want to change instructions while on vacation and away from his home television set. Ideally, the central station would include a convenience feature which automatically process telephone requests. The subscriber would change instructions by simply telephoning such a central station convenience feature which would be implemented by further circuitry not shown, but which would utilize well known techniques of telemetry whereby a coded signal would be transmitted by the central station to a telemetry whereby a coded signal would be transmitted by the central station to a telemetry receiver in the subscriber's home. The desired instructions, at time of implementation, would be stored in a memory and a clock would address the memory to extract the data therein at regular intervals during each day of the subscribers absence from his home. The data would then be applied as reference signals to the comparators 88 and 90 in the deactivator 42 of FIG. 2.

Figure 4:
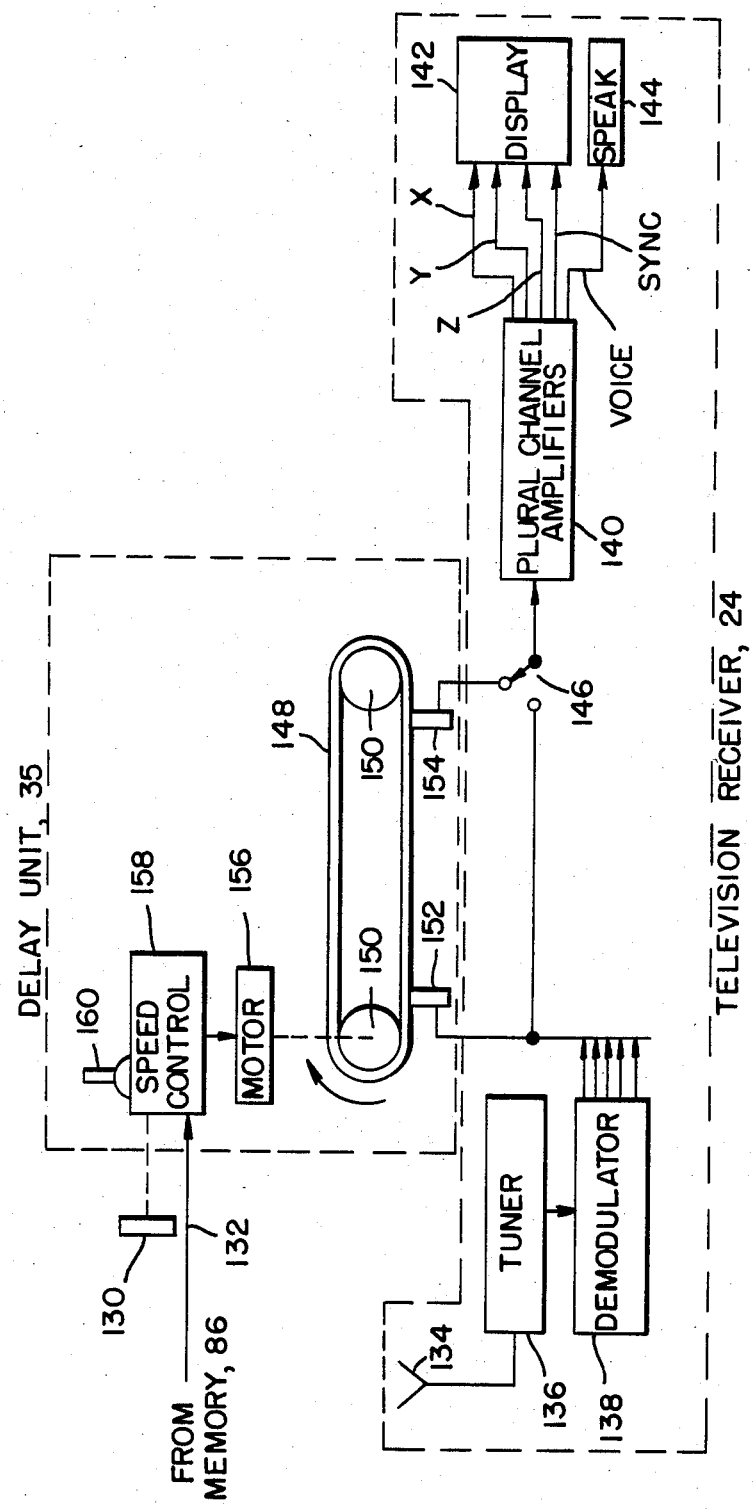
FIG. 4 is a diagram of a delay unit of FIG. 1.

FIG. 4 shows the construction of the delay unit 35. The delay unit 35 has been referred to previously with reference to FIG. 1 for providing personnel in the central station 32 with adequate time for responding to television programs being observed on the monitor 34 (FIG. 1). The amount of delay imparted by the unit 35 may be manually adjusted by rotation of a knob 130 (FIGS. 1 and 4) of the unit 35, or electronically via line 132 extending from the memory 86 (FIG. 2) in the deactivator 42 to the delay unit 35.

As shown in FIG. 4, the television receiver 24 is of conventional construction and includes an antenna 134, a tuner 136, a demodulator 138, a set of amplifiers 140, a display 142 for presentation of the visual portion of a television program, and a speaker 144 for presentation of the audio portion of the television program. In the operation of the television receiver 24, broadcast television signals are incident upon the antenna 134 from which they are coupled to the tuner 136. The tuner 136 amplifies and filters the signals of the specific channel to which the tuner 136 is tuned, and applies the amplified signals to the demodulator 138. The demodulator 138 extracts visual and audio data from the modulation of the television carrier signal, as is well known. Typically, the display 142 is a CRT (cathode ray tube) which is operated by X and Y deflection signals and a set of Z axis signals providing color information. Also included is a synchronization signal for operation of the display 142, and a voice signal for driving the speaker 144. These signals are coupled in separate channels from the demodulator 138 via corresponding ones of the amplifiers 140 to their respective terminals in the display 142 and the speaker 144. Thereby, information carried by an incident broadcast television signal is presented by the television receiver 24.

In accordance with a feature of the invention, the television receiver 24 is provided with a switch 146 connected between the demodulator 138 and the set of amplifiers 140. The switch 146 provides for either the direct connection of the signals from the demodulator 138 to the set of amplifiers 140 or, alternatively, provides for the shunting of the signals from the demodulator 138 via the delay unit 35 to the amplifiers 140. In the position shown in FIG. 4, the switch 146 is shunting the signals via the delay unit 35 to provide adequate time for personnel in the central station 32 (FIG. 1) to perform their monitoring functions. When the switch 146 is in the position for direct connection of the signals, the television receiver 24 is operated in conventional fashion without delay of the television program by the delay unit 35.

The delay unit 35 comprises a continuous belt 148 of magnetic material supported on a pair of rollers 150 for movement past a recording head 152 and a playback head 154 upon rotation of the rollers 150. The magnetic medium of the belt 148 stores signals from the demodulator 138 applied to the belt 148 by the recording head 152. The stored signals are read out from the belt 148 by the playback head 154 and applied via the switch 154 to the corresponding ones of the amplifiers 140.

The rollers 150 are rotated by an electric motor 156 operated in conventional fashion by electric signals provided by a speed-control circuit 158. The speed-control circuit 158 includes a switch 160 for selection of manual control by rotation of the knob 130, or electronic control by digital signals coupled from the memory 86 (FIG. 2) along the line 132.

The amount of delay imparted by the unit 35 is equal to the time elapsed as a storage site on the moving belt 148 passes from the recording head 152 to the playback head 154. A relatively slow movement of the belt 148 provides a relatively long delay, while a relatively fast movement of the belt 148 provides a relatively short delay. The speed of the belt 148 and, hence, the delay depends in the setting of the speed circuit 158. Such speed control circuits are well know and may be responsive to digitally encoded signals, such as that provided by the memory 86, or to digital signals provided by an encoder (not shown) operated by rotation of the knob 130.

With respect to the operation of the memory 86 (FIG. 2) described hereinabove, it is noted that the set of signals provided by the comparators 82 form digital words which address the memory 86 to provide the resistor output signals to the comparators 88 and 90. Additional ones of the addressing words are employed for outputting the desired control words on line 132 for selection of the speed of the belt 148 in the delay unit 35. Thereby, an operator in the central station 32 can designate a preferred amount of delay for the unit 35.

With respect to the construction of the delay unit 35, the use of the belt 148 having a magnetic medium is an economical and reliable procedure for imparting the desired amount of delay. Typically, such delay would be in the range of 5-15 seconds, though longer delay intervals could be employed if desired. It is also understood that other forms of delay devices may be utilized, particularly electronic circuitry employing converters for digitizing the television signals and random-access memories for storage of the digitized signals during the delay interval. By virtue of the foregoing system of the delay unit 35 and its interconnection with the system 20, the presentation of the television program to a subscriber is delayed by a sufficient amount of time to allow personnel at the central station to view the material and to initiate editing command signals as required. With respect to the alternative system 20A disclosed in FIG. 3, it is noted that a corresponding delay unit 35A may be inserted in output lines of the amplifier 110 and the camera 108 as shown in phantom in FIG. 3. The structure of the delay unit 35A would correspond to that of the delay unit 35, with delay time being selected by personnel at the transmitting station.

It is to be understood that the above-described embodiments of the invention are illustrative only, and that modifications thereof may occur to those skilled in the art. All forms of radio and television data can be transmitted. Accordingly, this invention is not to be regarded as limited to the embodiments disclosed herein, but is to be limited only as defined by the appended claims.

I claim:

1. A remote editing system for broadcast transmissions comprising:
   monitoring system means for monitoring broadcast transmissions from a plurality of sources of such transmissions to determine the program content of each of said broadcast transmissions;
   means for transmitting an editorial message based on said program content of individual ones of said broadcast transmissions to subscriber stations of said system;
   first receiving means in each of said subscriber stations for receiving said broadcast transmissions, said first receiving means including means for presentation of data of the broadcast transmissions;
   second receiving means in each of said subscriber stations for receiving said message;
   means coupled between said first and said second receiving means for operating said first receiving means in accordance with the message received by said second receiving means; and wherein
   said operating means includes means for delaying a presentation of data of said broadcast transmission relative to an occurrence of said editorial message to permit a monitoring of the broadcast transmissions by said monitoring means prior to the presentation of data of the broadcast transmissions at a subscriber station.

2. A system according to claim 1 wherein said operating means further comprises means for selecting one of said sources and means responsive to the identity of a source for selectively controlling said first receiving means in accordance with a source selection.

3. A system according to claim 2 further comprising means coupled to said monitoring means for signaling said editorial message, an output of said signaling means being coupled to said transmitting means for the transmission of said message to said subscriber stations.

4. A system according to claim 3 wherein said signaling means comprises means for encoding said editorial message based on the monitoring of said broadcast transmissions; and wherein
   said signaling means includes means for identifying the sources of respective ones of said broadcast transmissions, the identity of a source being included in said editorial message.

5. A system according to claim 3 wherein said signaling means comprises means for encoding said editorial message with a delay command signal designating the duration of a delay imparted by said delaying means.

6. A system according to claim 3 wherein said signaling means comprises means for encoding said editorial message based on the monitoring of said broadcast transmission, said encoding means providing for the encoding of said editorial message with a delay command signal designating the duration of a delay imparted by said delaying means; and wherein said signaling means includes means for identifying the sources of respective ones of said broadcast transmissions, the identity of a source being included in said editorial message.

7. A system according to claim 6 wherein said encoding means comprises a keyboard and means coupled to said keyboard for generating a set of tones, individual ones of said tones being activated in response to operation of said keyboard to provide a coded representation of said message.

8. A system according to claim 7 wherein said transmitting means include means for modulating said set of tones on a carrier frequency, a transmitting antenna, a transponder coupled to said transmitting antenna, and means for directing said set of ranging tones from said modulating means to said transponder for retransmission to said subscriber stations.

9. A system according to claim 3 wherein said transmitting means include transponder means responsive to a signal emanating from said signaling means and carrying said message for retransmission to said subscriber station.

10. A system according to claim 9 wherein said transmitting means includes antenna means coupled to said transponder means, said antenna means being located for propagating a radiated signal to individual ones of said subscriber stations.

11. The system according to claim 10 wherein said first receiving means includes means for inhibiting the reception of said broadcast transmissions.

12. A system according to claim 11 wherein said second receiving means includes means responsive to said editorial message for decoding said message, said decoding means being coupled to said inhibiting means for activating said inhibiting means to inhibit the reception of said broadcast transmissions in accordance with instructions of said editorial message.

13. A system according to claim 12 wherein said signalling means includes means for generating a set of tones and means for selecting individual ones of said tones in accordance with a code to permit transmissions of said editorial message as a coded signal.

14. A system according to claim 3 wherein said transmitting means includes means for combining said message with one of said broadcast transmissions, and wherein said first receiving means includes means for separating said message from said broadcast transmissions.

15. A remote editing system for use with a transmitter of broadcast transmission and receiving stations having receivers for the reception of such transmissions comprising:
monitoring system means for monitoring such transmissions from a plurality of sources of broadcast transmission to determine the program content of each of said broadcast transmissions, said monitoring means including editing means for generating editing command signals based on said program content of individual ones of said broadcast transmissions, said editing means including means for identifying the sources of respective ones of said broadcast transmissions, the identity of a source being included in said command signals;
means for distributing said command signals to said receiving stations;
means within each of said receiving stations for inhibiting the operation of said receivers, said inhibiting means being responsive to said command signals for the editing of programs of said broadcast transmissions; and wherein
each of said receivers includes means for presentation of data of the broadcast transmissions, and said inhibiting means includes means for delaying a presentation of data of said broadcast transmissions relative to an occurrence of one of said editing command signals to permit a monitoring of the broadcast transmissions by said monitoring means prior to presentation of data of the broadcast transmissions at a receiving station.

16. A system according to claim 15 wherein said inhibiting means further comprises means responsive to the identity of a source for selectively controlling a receiver in accordance with a source selection.

17. A system according to claim 16 wherein said distributing means includes means for reception of said command signals and for the retransmission of said command signals.

18. A system according to claim 17 wherein said distributing means includes an antenna located for radiating said command signal to said receiving stations, said antenna means being coupled to said means for retransmission.

19. A system according to claim 18 wherein said editing means include means for encoding said command signal in a form suitable for transmission to said antenna means.

20. A system according to claim 16 wherein said encoding means includes means for generating a set of tones, and encoding means including a keyboard and a read-only memory coupled between said keyboard and said generating means for activating a set of tones corresponding to the activation of keys of said keyboard, and wherein said distributing means includes means for modulating said set of tones on a carrier whereby said command signals are transmitted to said antenna means.

21. A system according to claim 20 wherein said inhibiting means includes means for decoding signals received from said distributing means for regenerating said command signals.

22. A system according to claim 16 wherein said distributing means includes means for combining said command signals with one of said broadcast transmissions, and wherein said receiving stations include means for separating said command signals from said broadcast transmissions.

23. A system according to claim 16 wherein said presentation means provides a recording of said program.

24. A remote editing system for use with the transmission of broadcasts transmissions and receiving stations having receivers for the reception of such transmissions and recorders for the recording thereof, comprising:
monitoring system means for monitoring such transmissions from a plurality of sources of broadcast transmission to determine the program content of each of said broadcast transmissions, said monitoring means including editing means for generating editing command signals based on a monitoring of the broadcast transmissions, and generating means including means for identifying the sources of respective ones of said broadcast transmissions, the identities of sources being included in said command signals;
means for distributing said command signals to said receiving station;

means within each of said receiving stations for inhibiting the operation of said recorders, said inhibiting means being responsive to said command signals for the editing of programs of said broadcast transmissions; and means within each of said receiving stations for delaying a presentation of broadcast transmissions to said recorders relative to the occurrence of one of said command signals to permit a monitoring of the broadcast transmissions by said monitoring means prior to presentation of data of the broadcast transmissions to the receivers and/or recorders in respective ones of said receiving stations.

25. A system according to claim 24 wherein said inhibiting means includes means responsive to the identity of a source for selectively controlling a recorder in accordance with a source selection.

26. A remote recording and editing system for broadcast transmissions, comprising:

first means for transmission audio or audio-visual information;

first receiving means in subscriber stations subscribing to services of said system for receiving said audio or audio-visual information, said receiving means including means for recording such information;

monitoring system means for monitoring broadcast tranmissions from a plurality of sources of broadcast transmission to determine the program content of each of said broadcast tranmissions;

second transmitting means for supplying an editorial command message based on said program content of individual ones of said broadcast transmissions, said signaling means including means for identifying the sources of respective ones of said broadcast transmissions, the identity of a source being included in said editorial command message;

second receiving means in each of said subscriber stations for receiving said command message;

means coupled between said first and said second receiving means and responsive to a selected one of said sources for operating said first receiving means in accordance with the message received by said second receiving means; and means for delaying a recording of said information until after a monitoring of said information.

27. A remote recording and editing system for broadcast transmissions, comprising:

first means for transmitting audio or audio-visual information;

first receiving means in subscriber stations subscribing to services of said system for receiving said audio or audio-visual information;

means for recording said information received by said first receiving means;

monitoring system means for monitoring broadcast transmissions from a plurality of sources of broadcast transmission to determine the program content of each of said broadcast transmissions, and means for signaling an editorial command message based on said program content of individual ones of said broadcast transmissions, said signaling means including means for identifying the sources of respective ones of said broadcast transmissions, the identity of a source being included in said editorial command message;

second means coupled to said signaling means for transmitting said command message to said subscriber stations;

second receiving means in said subscriber stations for receiving said command message;

means coupled between said second receiving means and said recording means for operating said recording means in accordance with the message received by said second receiving means and in accordance with a selected one of said sources; and said operating means includes means for delaying a recording of the information until after an interval of monitoring by said monitoring means.

28. Apparatus for selectively recording and deleting portions from selected television programs, comprising:

radio signal receiving means capable of selectively receiving radio signals on a plurality of different frequencies, at lease one of said frequencies being associated with a single television channel;

selector means to tune said receiving means to the frequency or frequencies associated with a selected television channel;

converting means capable of converting the radio signals received into electric command signals activating or deactivating a television program recorder set to the selected television channel;

monitoring system means for monitoring broadcast transmissions from a plurality of sources of broadcast transmission to determiine the program content of each of said broadcast transmissions;

means for delaying a presentation of the program to the recorder until after an interval of monitoring by said monitoring means;

means for generating said radio signals, said generating means providing said radio signals with an editorial message based on said program of individual ones of said broadcast tranmissions, said generating means including means for identifying the sources of respective ones of said broadcast transmissions, the identity of a source being included in said editorial message; and wherein said converting means includes means responsive to said identity of a source for selectively controlling such recorder in accordance with a source selection.

29. In a system for selectively recording and deleting portions from a selected television program, said system being formed of at least one television station, a television receiver and a recorder of televised programs, and further comprising a radio transmitter capable of selectively transmitting signals on a plurality of frequencies, an apparatus having:

means capable of receiving said radio signals on a plurality of selected frequencies, each such frequency being associated with a specific television channel;

means to select the frequency or frequencies of which said radio signals associated with the selected television channel are received;

means to convert said radio signals on the selected frequency or frequencies into electric commands to activate or deactivate the recorder of the program televised on the selected channel;

monitoring system means for monitoring broadcast transmissions from a plurality of sources of broadcast tranmission to determine the program content of each of said broadcast transmissions;

means for delaying a presentation of the program to the recorder for said recording until after an interval of monitoring by said monitoring means;

means for generating said radio signals, said generating means providing an editorial message to said radio signal based on said program content of individual ones of said broadcast transmissions, said generating means including means for identifying the sources of respective ones of said broadcast transmissions, the identity of a source being included in said editorial message; and wherein said converting means includes means responsive to said identity of a source for selectively controlling such recorder in accordance with a selected channel.

30. A method for remotely controlling recording and editing of broadcast transmissions by deletion of portions of programs transmitted over the air or by cable, such recording and editing being done in accordance with prior instructions, which method comprises:

providing recording means capable of recording radio or television programs for subsequent replay;

visually and/or auditorially monitoring a plurality of said programs from a plurality of sources of transmission of such programs to determine the beginning and the end of portions of the programs to be recorded and to be deleted;

providing a radio transmitter functioning independently of the transmission of said programs;

generating command signals based on the content of each of said programs, providing said command signals with identifications of the sources of transmission of said programs, and sending the command signals to said radio transmitter so as to activate said transmitter;

providing receiving means and coupling thereto converting means capable of receiving and converting said radio transmissions into command signals to activate and deactivate said recording means;

delaying a reception of said programs at said recording means until after an interval of time of said monitoring;

at the beginning and at the end of the portions of the program to be recorded and to be deleted, activating said radio transmitter so as to cause said transmitter to transmit radio command signals to said receiving and converting means so as to cause said converting means to activate or deactivate the recording means with prior instructions.

31. A method for recording and editing by deleting portions of program transmitted over the air or by cable, in accordance with predetermined instructions comprising:

providing recording means coupled to a television and/or radio receiver, and being capable of recording radio or television programs for subsequent replay;

visually and/or auditorially monitoring a plurality of radio or television programs from a plurality of sources of transmission of such programs to determine the beginning and the end of portions of a program to be recorded and to be deleted;

providing a radio-transmitter for transmitting radio command signals;

operating receiving means and associated therewith converting means capable of receiving and converting said radio transmissions into electric command signals to activate and deactivate said recording means;

delaying a reception of said programs at said recorder until after an interval of time of said monitoring; and a the beginning and at the end of the portions of the program to be recorded and to be deleted, sending electric command signals to said radio transmitter to transmit said radio command signals to said receiving and converting means so as to cause said converting means to activate or deactivate the recording means in accordance with predetermined instructions; and wherein said step of sending command signals includes a step of providing the command signals with an editorial message based on the content of each of said programs, which message includes the identity of the source of transmission from which a program is transmitted, said step of operating receiving means including a step of initiating activation and deactivation of the recording means in accordance with a selection of the source of program transmission.

32. A system for the remote editing of a broadcast transmission from one source of such transmission, said system comprising:

monitoring system means located at a first site for monitoring broadcast transmissions from a plurality of sources of such transmissions including said one source to determine the program content of each of said broadcast transmissions, said one source being located at a second site distant from said first site;

means for signaling an editorial message in accordance with instructions received at said first site, said signaling means being operative at the times of occurrence of predetermined features of said program content as determined by said instructions for signaling said message in accordance with the times of occurrence of such features;

means at a third site distant from said first and said second sites for receiving said message;

means coupled to said receiving means for operating a receiver and/or recorder of the broadcast transmission in accordance with said message, said receiver and/or said recorder being located at said third site; and means for delaying the reception of a transmission from said second site relative to the reception at said third site of a transmission from said first site so as to provide time for operation of said monitoring means.

33. A system according to claim 32 wherein said signaling means includes means for encoding said message with a code identifying the source of broadcast transmissions to which said message pertains, and wherein said operating means includes means responsive to the code identifying the source for selectively controlling said receiver and/or recorder in accordance with a selected source of said plurality of sources.

34. A system according to claim 33 wherein said broadcast transmission from said one source is an audio or audio-visual transmission.

35. A system according to claim 33 wherein said broadcast transmission from said one source is a television program.

36. A system according to claim 33 wherein said operating means activates and deactivates said receiver and/or said recorder.

37. A method of monitoring and editing broadcast transmissions including audio and audio-visual programs comprising the steps of:

receiving said transmissions at a first site from a remote source of such programs at a second site;

receiving at said first site instructions for editing such transmissions to be viewed and/or recorded at a third site;

monitoring the programs to detect the broadcast of subject matter identified in said instructions;

controlling a remote receiver and/or recorder of such transmissions located at said third site to operate in accordance with said instructions upon the tranmission of said subject matter; and delaying the reception of a transmission from said second site relative to the reception at said third site of a transmission from said first site so as to provide time for said step of monitoring.

38. A method according to claim 36 wherein said instructions are provided by a user of said receiver and/or recorder at said third site.

39. A method according to claim 36 wherein said step of controlling comprises a step of transmitting a control signal to said third site.

40. A method according to claim 38 wherein said step of transmitting includes a step of encoding said control signal with information corresponding to the nature of said subject matter.

41. A method according to claim 39 wherein said step of encoding includes an identifying of a source of a broadcast transmission.

* * * * *